(12) United States Patent
Smith

(10) Patent No.: US 9,642,304 B1
(45) Date of Patent: May 9, 2017

(54) FLOATING DECK SYSTEM FOR RIDING LAWN MOWERS

(71) Applicant: Totally New Technologies LLC, Goodlettsville, TN (US)

(72) Inventor: Ronnie E. Smith, Goodlettsville, TN (US)

(73) Assignee: Totally New Technologies LLC, Nashville, TN (US)

(*) Notice: Subject to any disclaimer, the term of this patent is extended or adjusted under 35 U.S.C. 154(b) by 81 days.

(21) Appl. No.: 14/731,853

(22) Filed: Jun. 5, 2015

Related U.S. Application Data

(60) Provisional application No. 62/008,036, filed on Jun. 5, 2014.

(51) Int. Cl.
| *A01D 34/00* | (2006.01) |
| *A01D 34/74* | (2006.01) |
| *A01D 34/64* | (2006.01) |

(52) U.S. Cl.
CPC .............. *A01D 34/74* (2013.01); *A01D 34/64* (2013.01)

(58) Field of Classification Search
CPC .. A01D 34/74; A01D 2034/645; A01D 34/64; A01D 34/662; A01D 2034/6843; A01D 34/661; A01D 2101/00
USPC ......................................................... 56/17.1
See application file for complete search history.

(56) References Cited

U.S. PATENT DOCUMENTS

| 2,900,836 | A | | 8/1959 | Beard | |
| 3,608,288 | A | | 9/1971 | Heth | |
| 4,116,086 | A | | 9/1978 | Langford | |
| 4,548,094 | A | | 10/1985 | Huitema | |
| 4,760,686 | A | * | 8/1988 | Samejima | A01D 34/74 56/15.8 |
| 4,829,754 | A | * | 5/1989 | Shimamura | A01D 34/662 56/15.9 |
| 5,062,316 | A | | 11/1991 | Lykken | |
| 5,138,825 | A | | 8/1992 | Trefz | |
| 5,337,543 | A | * | 8/1994 | Kitamura | A01D 34/68 56/10.8 |
| 5,458,021 | A | | 10/1995 | Wichelt | |
| 5,927,055 | A | * | 7/1999 | Ferree | A01D 34/662 56/15.9 |
| 6,347,503 | B1 | * | 2/2002 | Esau | A01D 34/64 56/15.9 |
| 6,625,968 | B2 | * | 9/2003 | Gloudemans | A01D 34/64 56/15.2 |
| 7,013,626 | B1 | * | 3/2006 | Strope | A01D 34/68 56/15.8 |
| 7,213,662 | B2 | * | 5/2007 | Crumly | A01D 34/6806 180/19.1 |

(Continued)

*Primary Examiner* — Árpád Fábián-Kovács
(74) *Attorney, Agent, or Firm* — Shane V. Cortesi

(57) ABSTRACT

Several systems that create a floating cutting deck for a riding lawn mower are described. The first system is a bar assembly, with a moveable stop, that attaches to and covers the teeth of a lift handle assembly of a conventional riding lawn mower. The second system is a new design for a riding lawn mower that uses a moveable stop (instead of a plurality of teeth) in the lift handle assembly. In both systems, the lift handle is able to move away from the stop (and thereby allow the cutting deck to rise relative to the main frame) when the terrain under the cutting deck is higher than the terrain under the lawn mower's main wheels.

20 Claims, 12 Drawing Sheets

(56) References Cited

U.S. PATENT DOCUMENTS

| | | | |
|---|---|---|---|
| 7,441,392 B2 * | 10/2008 | Lilliestielke | A01D 34/74 56/15.2 |
| 7,578,117 B2 * | 8/2009 | Shaffer | A01D 34/74 56/17.1 |
| 7,587,886 B1 * | 9/2009 | Sugden | A01D 34/661 56/14.9 |
| 8,104,552 B2 * | 1/2012 | Papke | A01D 34/82 180/19.3 |
| 8,438,822 B2 * | 5/2013 | Lancaster | A01D 34/74 56/17.1 |
| 2001/0037634 A1 * | 11/2001 | Schick | A01D 34/64 56/15.9 |
| 2002/0011059 A1 | 1/2002 | Moore | |
| 2007/0039304 A1 * | 2/2007 | Wright | A01D 34/74 56/14.9 |
| 2014/0083070 A1 * | 3/2014 | Berglund | A01D 34/74 56/14.7 |

* cited by examiner

FLOATING DECK SYSTEM FOR RIDING LAWN MOWERS

RELATED APPLICATIONS

This application claims priority under 35 USC §119 to U.S. Provisional Patent Application Ser. No. 62/008,036, the entire contents of which are hereby incorporated by reference.

BACKGROUND

Technical Field

The present invention relates to systems that create a floating cutting deck for self-propelled, riding lawn mowers.

Background of the Invention

As shown in FIGS. 9-10, riding lawn mowers 10 typically include a main frame 12, a plurality of main wheels 14 connected to the main frame 12, a motor 20 connected to the main frame 12 and configured to rotate at least some of the main wheels 14 so to move the riding lawn mower 10 forwardly and rearwardly, optionally, a seat 36 connected to the top side of the main frame 12, a steering wheel 38 connected to the main frame 12 and configured to steer at least some of the wheels 14 (e.g, the front wheels 14), and a cutting deck 16 (also called a mower deck) connected to the underside of the main frame 12. The cutting deck 16 includes one or more grass cutting blades 18 that are rotated by the motor 20. Typically, the cutting deck 16 includes several wheels 40 or a roller bar attached to the bottom of the cutting deck 16 so the cutting deck 16 rides along the lawn. Typically, these cutting deck wheels 40 are located off of the ground. Typically, the mower operator adjusts the height of the cutting deck 16 at a desired height and then proceeds to mow his/her lawn at this desired height.

Most riding lawn mowers 10 use either an electrically-powered hydraulic lift system or a manual lift handle system to raise and lower the height of the cutting deck 16 relative to the main frame 12, and thereby, adjust the height that the mower 10 cuts the lawn. Electrically-powered hydraulic lift systems are typically used in expensive lawn riding lawn mowers and use a hydraulic lift to position the height of the cutting deck 16 relative to the main frame 12. By contrast, manual lift handle systems are used in the majority of riding lawn mowers, and, as shown in FIG. 1, include a lift handle 72 that has a bottom end attached to the cutting deck 16 and a top end that includes a grip 74, a slot 26 and a plurality of teeth 11A-11I adjacent to the slot 26. The grip 74 extends above the slot 26. Typically, numerals indicating the cutting height are placed next to each tooth 11, and hash marks indicate half-intervals (e.g., 1.5, 2.5, 3.5, etc). When mowing the lawn, the user locks the handle 72 into place in one of the teeth 11A and proceeds to mow the lawn. To adjust the cutting deck 16 height, the user 1) stops mowing; 2) moves the handle 72 out of the tooth 11A; 3) moves the handle 72 into the slot 26; 4) moves the handle 72 proximally or distally along the slot length 32, depending on whether the user desires to raise or lower the cutting deck 16 height; and 5) then moves the handle 72 again into another tooth 11B-11I.

The problem with such prior art manual handle lift systems and electrically-powered hydraulic lift systems is that the cutting deck 16 is locked into place relative to the main frame 12 and the main wheels 14. Thus, as shown in FIG. 10, when the riding lawn mower 10 encounters a hill 100 or other uneven terrain that causes the terrain under the cutting deck 16 to be higher than the terrain under the main wheels 14, the cutting deck 16 scalps the lawn because the height of the cutting deck 16 is fixed relative the main wheels 14.

To attempt to address this problem, a number of prior art systems have been developed that couple the cutting deck 16 to the main frame 12 using a systems of chains. The objective of these systems is to allow the cutting deck 16 to float relative to the main frame 12. Typically, the cutting deck 16 is hung between the front and rear wheels 14 and beneath the main frame 12 by chains, links or other devices, so the cutting deck 16 is adapted to rise up when skids, wheels 40, rollers and the like attached to the cutting deck 16 underside contact the lawn surface. See, for example, U.S. Pat. Nos. 6,711,885 and 5,946,893. Generally, the intent for such deck suspension system is to avoid continuing contact with the earth surface. For example, when the mower 10 rides over an earth-surface rise which is relatively severe (that is, short in horizontal length compared to the wheel base of the mower 10 and great in height compared to the pre-set elevation of the cutting deck 16) it is intended that the deck 16 will rise or "float" upwardly, so the rotary blades 18 will not hit the earth surface. Unfortunately, these hung deck systems are often overly complex and it has been reported that, even with these systems, scalping still occurs in certain terrain. Indeed, some of these systems utilize a roller on the rear of the cutting deck 16, which is believed to be problematic because the front of the cutting deck 16 would have already started to scalp the hill 100 before the roller moves the cutting deck 16 upwardly.

Thus, there is a need for lawn mower deck systems that are less prone to scalping and are cheap to make and implement into existing riding lawn mower designs.

BRIEF SUMMARY

The present invention provides new riding lawn mowers that have a cutting deck floatation system that is less prone to scalping grass, as well as bar assemblies that are used to retrofit conventional riding lawn mowers with the cutting deck floatation system.

In some embodiments, the present invention provides a riding lawn mower that includes:

i) a main frame;

ii) a plurality of main wheels connected to the main frame and configured to drive and/or steer the riding lawn mower over terrain;

iii) a cutting deck comprising at least one blade connected to the main frame;

iv) a motor configured to turn the at least one blade and at least one of the main wheels;

v) a lift handle assembly comprising a lift handle connected to the cutting deck, a handle slot located in the main frame and comprising a slot proximal end, a slot distal end, a moveable stop located immediately proximal to the handle, and a slot length extending from the slot proximal end to the slot distal end, the lift handle located in the slot and extending above the slot and configured to freely glide along the slide length distal to the stop, the stop configured to prevent the handle from moving proximal to the stop, wherein, when terrain located under the cutting deck is higher than the terrain under the main wheels, the lift handle is configured to glide distally from the stop and cause the cutting deck to rise relative to the frame.

Optionally, the riding mower comprises a seat connected to the main frame and configured to carry a human passenger. Optionally, the riding mower comprises a steering wheel connected to the main frame and configured to steer the riding lawn mower. Optionally, the cutting deck comprises a plurality of wheels. Optionally, the cutting deck comprises a roller. Optionally, the stop is a moveable bar. Optionally, the riding lawn mower further includes an adjustment assembly comprising an adjustment slot adjacent to, to the side of, the handle slot and located in the main frame and an adjustment knob connected to the stop, the adjustment slot having a proximal end, a distal end, and a length extending from the proximal end to the distal end, the adjustment knob slideable directly above the adjustment slot and configured to move the stop. Optionally, the adjustment assembly further comprises a track directly below the adjustment slot, the track having a proximal end, a distal end, and a track length extending from the proximal end to the distal end, an upper arm located in the track, the upper arm comprising an aperture and configured to slide along the track length, a lower arm directly below the track and comprising an aperture, the stop extending from the lower arm, a threaded rod passing through upper arm and the lower arm apertures, wherein adjustment of the knob is configured to cause the lower arm to move upwardly towards the track and the upper arm and frictionally lock the upper arm at a position along the track length. Optionally, the riding lawn mower further includes a lower slot located directly below the adjustment slot, the lower slot having a proximal end, a distal end, and a length extending from the proximal end to the distal end, a threaded rod extending from the knob, the threaded rod having an upper end connected to the knob and a lower end, a first arm comprising an aperture, a second arm comprising an aperture, the threaded rod passing through the apertures, the first arm and the second arm configured to slide along the main frame, wherein adjustment of the knob is configured to cause the first arm and second arm to move toward each other and frictionally lock the firm arm and the second arm at a position along the lower slot length. Optionally, the adjustment slot length is generally parallel to the handle slot length.

In other embodiments, the present invention provides a riding lawn mower that includes:
    i) a main frame;
    ii) a plurality of main wheels connected to the main frame and configured to drive and/or steer the riding lawn mower over terrain;
    iii) a cutting deck comprising at least one blade connected to the main frame;
    iv) a motor configured to turn the at least one blade and at least one main wheel;
    v) a lift handle assembly comprising a lift handle connected to the cutting deck, a handle slot located in the main frame and comprising a slot proximal end, a slot distal end, a slot length extending from the slot proximal end to the slot distal end, and a bar extending from the lift handle, the lift handle located in the slot and extending above the slot; and
    vi) an adjustment assembly comprising an adjustment slot adjacent to the handle slot and located in the main frame, a stop and an adjustment knob connected to the stop, the adjustment slot having a proximal end, a distal end, and a length extending from the proximal end to the distal end, the adjustment knob slideable along the adjustment slot length and configured to move the stop along the adjustment slot length;
wherein the stop is configured to releasably engage the handle bar and prevent the handle bar from moving proximal to the stop, and wherein, when terrain located under the cutting deck is higher than the terrain under the main wheels, the lift handle is configured to glide distally from the stop and cause the cutting deck to rise relative to the frame.

Optionally, the bar extends from the lift handle at an angle of between about 85 and about 95 degrees relative to the lift handle. Optionally, the bar extends from the lift handle below the handle slot.

The present invention also provides a method of retrofitting a riding lawn mower to allow the cutting deck to float relative to the main frame. In some embodiments, the method includes the following steps:
    a) providing a riding lawn mower comprising:
        i) a main frame;
        ii) a plurality of main wheels connected to the main frame and configured to drive and/or steer the riding lawn mower over terrain;
        iii) a cutting deck comprising at least one blade connected to the main frame;
        iv) a motor configured to turn the at least one blade and at least one of the main wheels;
        v) a lift handle assembly comprising a lift handle connected to the cutting deck, a slot located in the main frame and comprising a slot proximal end, a slot distal end, and a slot length extending from the slot proximal end to the slot distal end, and a plurality of teeth adjacent to the slot, the lift handle extending above the slot and configured to move from a first tooth to a second tooth distal to the first tooth, wherein the movement of the lift handle from the first tooth to the second tooth is configured to cause the cutting deck to rise relative to the frame;
    b) providing a bar assembly comprising a first bar, the first bar having a proximal end, a distal end, a length extending from the proximal end to the distal end, a handle side configured to face the lift handle, a second side opposite to the handle side, a width extending from the handle side to the second side, and a stop extending laterally from the handle side; and
    c) attaching the bar assembly to the main frame of the riding lawn mower so that the bar assembly at least partially covers at least one tooth, so that the lift handle is able to freely glide along the handle side distal to the stop, and so that the stop prevents the handle from moving proximal to the stop.

Optionally, the riding mower comprises a seat connected to the main frame and configured to carry a human passenger. Optionally, the riding mower comprises a steering wheel connected to the main frame and configured to steer the riding lawn mower. Optionally, the cutting deck comprises a plurality of cutting deck wheels. Optionally, the cutting deck comprises a roller. Optionally, after step c, the method further comprises d) moving the lift handle along the bar length distal to the stop. Optionally, the moving of the lift handle along the handle side distal to the stop causes the cutting deck to rise relative to the main frame. Optionally, the method further comprises: d) moving the lawn mower over uneven terrain so that the terrain under the cutting deck is higher than the terrain of the main wheels; e) allowing the handle to move along the handle side distally from the stop; and f) allowing the cutting deck to rise relative to the main frame. Optionally, the bar assembly further comprises a second bar, the second bar having a proximal end, a distal end, a length extending from the proximal end to the distal end, a handle side configured to face the lift handle, a second side opposite to the handle side, a width extending from the handle side to the second side, the first bar spaced a distance from the second bar, and step c) comprises bracketing the teeth with the first bar and the second bar. Optionally, the first and the second bar each further comprise a slot, the bar assembly further comprises a knob, located above the first and second bars, a stem extending downwardly from the knob and located above the first and second bars, and a threaded rod extending downwardly from the stem and passing through the first and second bars, and step c) further comprises rotating the knob so that the stem narrows the distance between the first bar and the second bar.

In some embodiments, the present invention provides a bar assembly that includes:

i) an upper bar comprising a proximal end, a distal end, a length extending from the proximal end to the distal end, a handle side configured to face a lift handle of a riding lawn mower, a second side opposite to the handle side, a width extending from the handle side to the second side, a top side, a bottom side, a height extending from the top side to the bottom side, and a slot;

ii) a lower bar located an adjustable distance below the upper bar, the lower bar comprising a proximal end, a distal end, a length extending from the proximal end to the distal end, a handle side configured to face a lift handle of a riding lawn mower, a second side opposite to the handle side, a width extending from the handle side to the second side, a top side, a bottom side, a height extending from the top side to the bottom side, and a slot;

iii) a rotatable knob located above the upper bar and the lower bar;

iv) a stem located below the knob and above the upper bar and the lower bar;

v) a bracket comprising a top arm located above the top side of the upper bar, and a bottom arm located below the bottom side of the lower bar, each of the bottom arm and the top arm comprising an aperture; and vi) a threaded rod extending from the stem and passing through the slots and the apertures;

wherein rotation of the knob is configured to push the upper bar towards the lower bar, and wherein at least one of the upper bar and the lower bar comprise a stop extending laterally from the handle side.

Optionally, the stop is located adjacent to the proximal end of the upper bar.

The present disclosure also provides a method of retrofitting a riding lawn mower to allow a cutting deck to float relative to the main frame, the method comprising:

a) providing a riding lawn mower comprising:
   i) a main frame;
   ii) a plurality of main wheels connected to the main frame and configured to drive and/or steer the riding lawn mower over terrain;
   iii) a cutting deck comprising at least one blade connected to the main frame;
   iv) a motor configured to turn the at least one blade and at least one of the main wheels;
   v) a lift handle assembly comprising a lift handle connected to the cutting deck, a slot located in the main frame and comprising a slot proximal end, a slot distal end, and a slot length extending from the slot proximal end to the slot distal end, and a plurality of teeth adjacent to the slot, the lift handle extending above the slot and configured to move from a first tooth to a second tooth distal to the first tooth, wherein the movement of the lift handle from the first tooth to the second tooth is configured to cause the cutting deck to rise relative to the frame;

b) providing a bar assembly comprising:
   i) an upper bar comprising a proximal end, a distal end, a length extending from the proximal end to the distal end, a handle side configured to face the lift handle, a second side opposite to the handle side, a width extending from the first side to the second side, a top side, a bottom side, a height extending from the top side to the bottom side, and a slot;
   ii) a lower bar located an adjustable distance below the upper bar, the lower bar comprising a proximal end, a distal end, a length extending from the proximal end to the distal end, a handle side configured to face the lift handle, a second side opposite to the handle side, a width extending from the first side to the second side, a top side, a bottom side, a height extending from the top side to the bottom side, and a slot;
   iii) a rotatable knob located above the upper bar and the lower bar;
   iv) a stem located below the knob and above the upper bar and the lower bar;
   v) a bracket comprising a top arm located above the top side of the upper bar, and a bottom arm located below the bottom side of the lower bar, each of the bottom arm and the top arm comprising an aperture; and
   vi) a threaded rod extending from the stem and passing through the slots and the apertures,
wherein at least one of the upper bar and the lower bar comprise a stop extending laterally from the handle side of the upper bar or the lower bar; and c) positioning the upper bar above the teeth and the lower bar below the teeth; and d) rotating the knob so that the stem pushes the upper bar towards the lower bar and the teeth so that the bar assembly releasably clamps to the teeth.

Optionally, after step d), the upper bar at least partially covers at least one tooth. Optionally, after step d), the stop prevents the handle from moving proximal to the stop. Optionally, wherein, after step d), the method further comprises e)

moving the lift handle along the handle sides distal to the stop. Optionally, the moving of the lift handle along the handle sides distal to the stop causes the cutting deck to rise relative to the main frame. Optionally, the method further comprises: e) moving the lawn mower over uneven terrain so that the terrain under the cutting deck is higher than the terrain of the main wheels; f) allowing the handle to move distally from the stop; and g) allowing the cutting deck to rise relative to the main frame. Optionally, the method further comprises using the cutting deck to cut grass.

BRIEF DESCRIPTION OF THE DRAWINGS

FIG. 8 further illustrates movement of the lift handle distal to the stop.

in FIG. 10, the terrain below the cutting deck is higher than the terrain under the main wheels, which is causing the cutting deck to scalp the lawn.

in FIG. 11, the terrain below the cutting deck is higher than the terrain under the main wheels, but, due to the floating lift handle and floating cutting deck, the cutting deck is not scalping the lawn.

DETAILED DESCRIPTION

Figure 9:
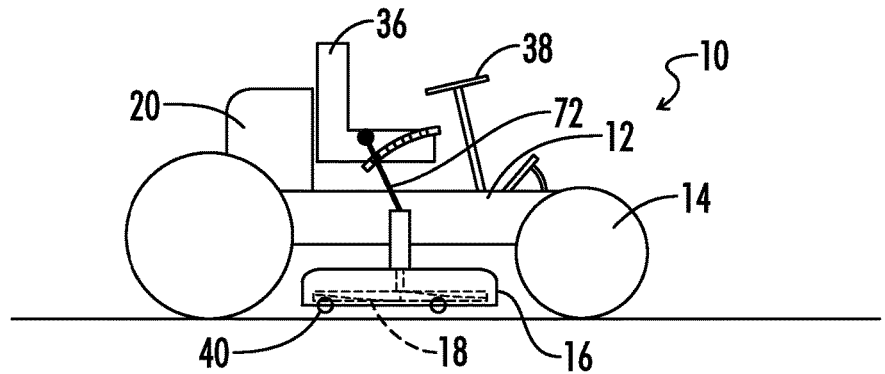
FIG. 9 illustrates a side, elevation view of a riding lawn mower of the prior art riding over flat terrain.
Figure 10:
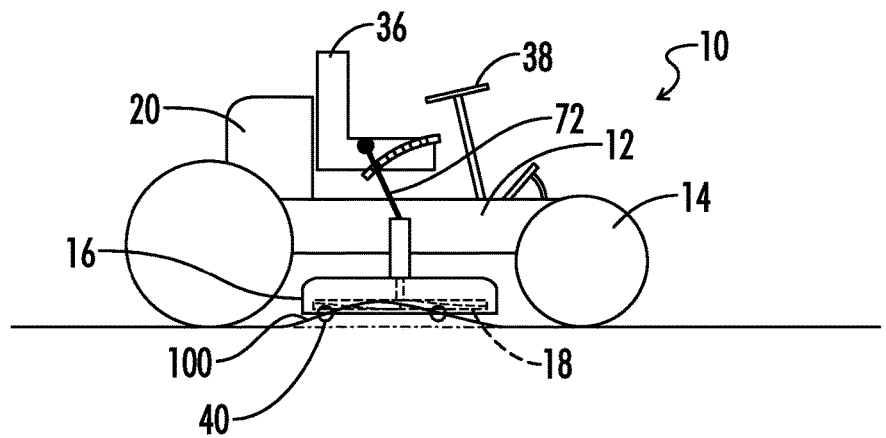
FIG. 10 illustrates a side, elevation view of a riding lawn mower of the prior art riding over a hill.
Figure 11:
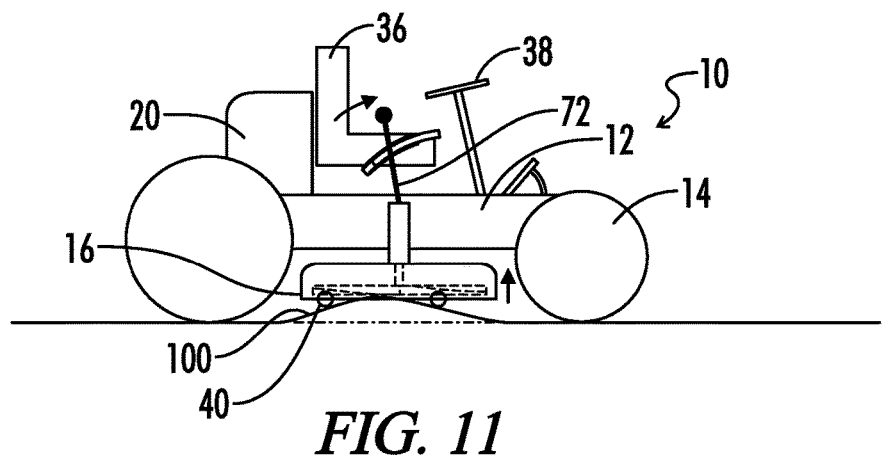
FIG. 11 illustrates a side, elevation view of a riding lawn mower of one embodiment of the present invention.

The present invention provides systems for a riding lawn mower 10 that allow the cutting deck 16 to float upwardly relative to the main frame 12. As explained in greater detail below, this may be achieved by providing a proximal stop 34 for the lift handle 72 and the lift handle 72 (or the bar 24 of the lift handle 72) rests against the proximal stop 34 when the riding lawn mower 10 is on even terrain. When the lift handle 72 (or the bar 24 of the lift handle 72) rests against the proximal stop 34, the cutting deck 16 is at its lowest point relative to the main frame 12 (and relative to seat 36 and steering wheel 38), which thereby sets the minimum cutting height of the riding lawn mower 10. Unlike the prior art systems of FIGS. 1, 9 and 10, when the cutting deck 16 is over terrain that is higher than the terrain under the main wheels 14, the cutting decks 16 of the systems of the present invention are able to rise relative to the main frame 12 so the mower 10 is less likely to scalp the lawn, as shown in FIG. 11. By contrast, when the mower 10 of the prior art, as illustrated in FIG. 10, encounters a hill 100 that makes the terrain under the cutting deck 16 higher than under the main wheels 14, the riding lawn mower 10 will tend to scalp the grass. (This type of terrain may be encountered, when, for example, mowing over a short hill. This terrain may also be encountered while mowing along the length of a ditch due to the fact that the typical cutting deck 16 of a riding lawn mower 10 is wider than its wheel base and, thus, the cutting deck 16 but not the wheels 14 may be over an upslope of the ditch). As explained in greater detail below, the anti-scalping feature of the present invention may be achieved by allowing the lift handle 72 to float (freely move) distally—but not proximally—along the slot length 32. Once the lawn mower 10 is back on even terrain, gravity will cause the cutting deck 16 to fall, the lift handle 72 will move proximally until contacting the stop 34 and the cutting deck 16 will again return to its minimum height. It will be appreciated that there are many situations in which it will be desirable to use the systems of the present invention to decrease scalping and the situations discussed herein and shown in the drawings are merely exemplary.

The present invention provides two distinct groups of systems to achieve this floating cutting deck 16 effect.

Figure 1:
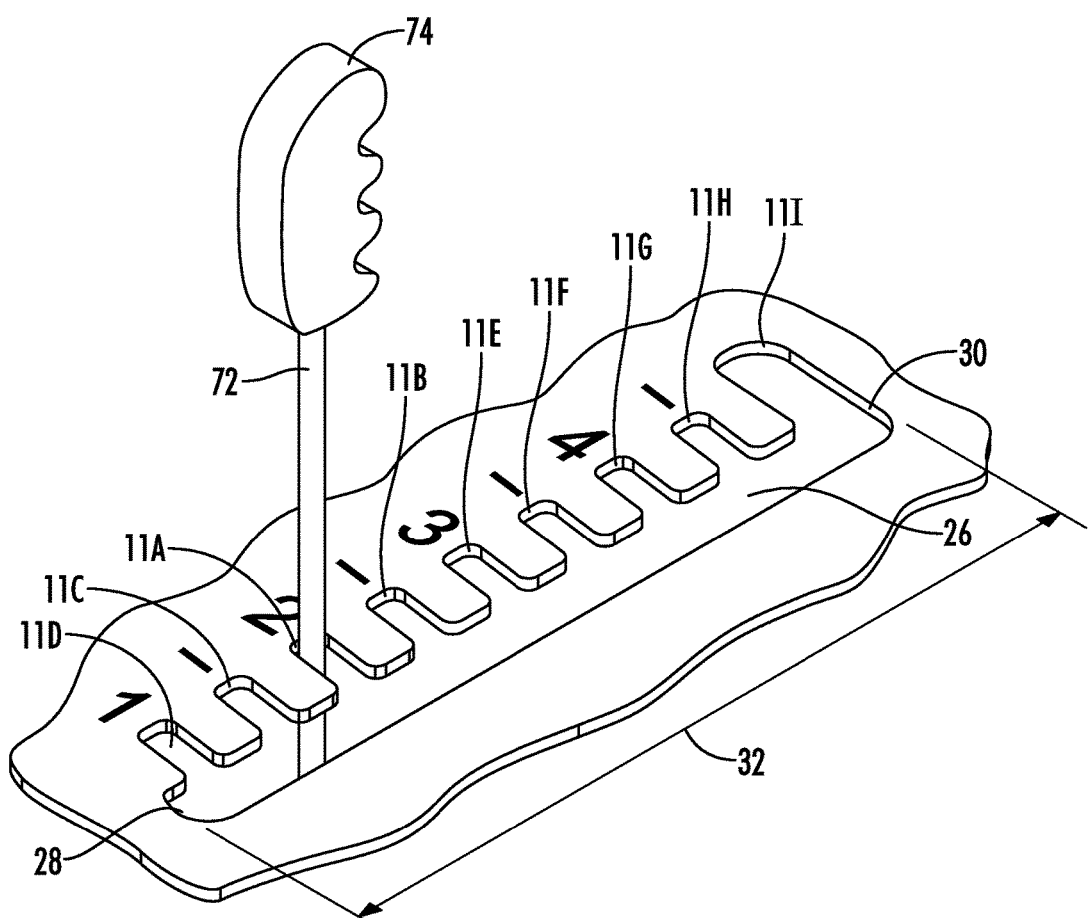
FIG. 1 illustrates an isometric view of a prior art lift handle assembly of a riding lawn mower.
Figure 2:
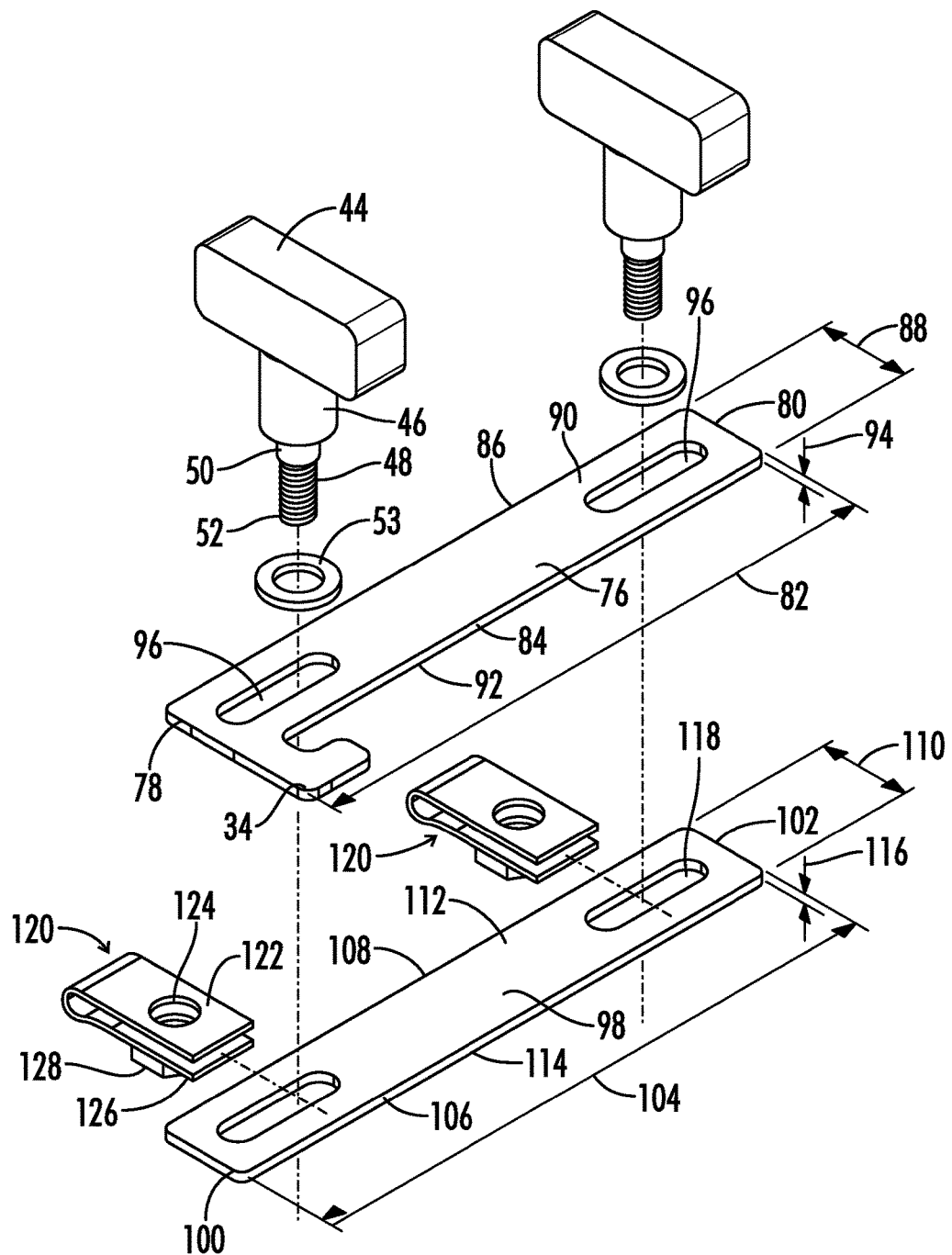
FIG. 2 illustrates an exploded, isometric view of a bar assembly of one embodiment of the present invention.
Figure 3:
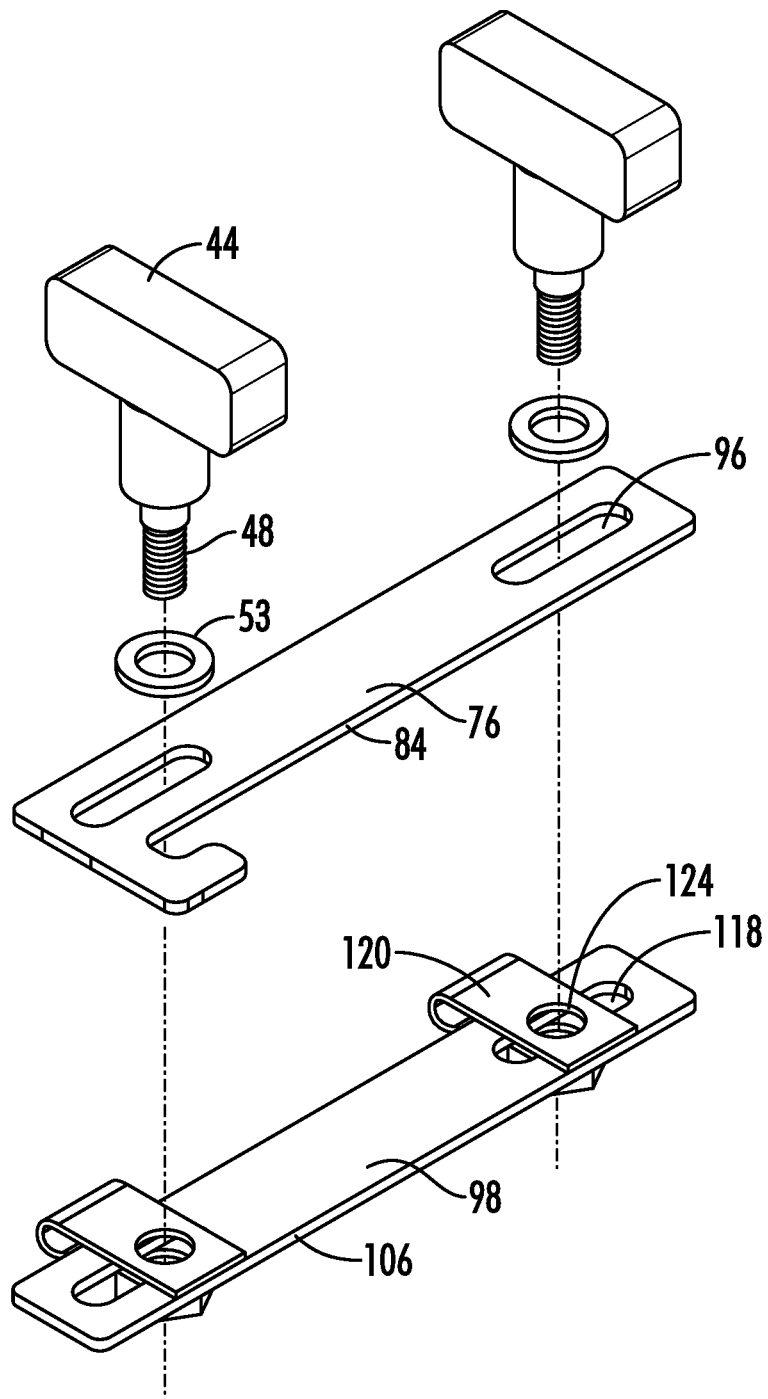
FIG. 3 illustrates another exploded, isometric view of the bar assembly of FIG. 2.

The first system is generally shown in FIGS. 2-8 and includes a bar assembly that is used to retrofit an existing riding lawn mower 10 to achieve this floating cutting deck 16 effect. In the drawings, not all reference numbers are included in each drawing for the sake of clarity. More particularly, as previously described and as shown in FIGS. 1, 9 and 10, typical riding lawn mowers 10 include a main frame 12, a plurality of main wheels 14 (e.g., between three and four wheels 14) connected to the main frame 12 and configured to move and steer the riding lawn mower 10 over terrain, a seat 36 connected to the main frame 12 and configured to carry a human passenger, a steering wheel 38 connected to the main frame 12 and configured to steer (turn) the riding lawn mower (preferably through steering the front wheels 14), a cutting deck 16, which includes at least one blade 18 configured to the cut grass, connected to the main frame 12, and a motor 20 configured to turn the least one blade 18 and at one of the main of wheels 14 to move the riding lawn mower 10 over the terrain. Preferably, the at least one blade 18 rotates perpendicularly relative to the rotation of the main wheels 14. As used herein, the term "main frame" 12 refers to the principal frame or body or chassis of the lawn mower 10, which is typically comprised of steel or aluminum. It will be understood that the main frame 12 may consist of several pieces welded together. The cutting deck 16 may include cutting deck wheels 40, rollers or the like that facilitate rolling of the cutting deck 16 along the terrain. The term "main wheels" 14 is used to distinguish the principal wheels that drive and steer the riding lawn mower 10 over the terrain, as compared to the cutting deck wheels 40 which merely facilitate rolling of the cutting deck 16 along the terrain. Some of the main wheels 14 may drive the riding lawn mower and some of the main wheels 14 may steer the riding lawn mower. For example, in a 2-wheel drive setup, the rear wheels 14 may drive whereas the front wheels 14 may steer. And in a 4-wheel drive setup, all main wheels 14 may drive and the front wheels 14 may steer. The typical riding lawn mower 10 usually further includes a lift handle assembly that includes a lift handle 72 connected to the cutting deck 16, a lift handle slot 26 located in the main frame 12 that has a slot proximal end 28, a slot distal end 30, a slot length 32 extending from the proximal end 28 to the distal end 30, and a plurality of teeth 11A-I adjacent to the slot 26. In the typical riding lawn mower 10, there are numerals next to each tooth 11A-I, with each numeral representing the cutting height when the lift handle 72 is located in that respective tooth 11A-I. In the prior art riding lawn mowers 10, the teeth 11A-I typically lock the lift handle 72 (and attached cutting deck 16) into place and to change the height of the cutting deck 16, the user moves the lift handle 72 out of one tooth 11A and into a proximal tooth 11C or 11D (if it is desired to lower the cutting deck 16) or into a distal tooth 11B or 11E-I (if it is desired to raise the cutting deck 16).

A bar assembly is then used to retrofit the riding lawn mower 10, as shown in FIGS. 2-8. In some embodiments, the bar assembly includes one or more of the following features:

i) an upper bar 76 comprising a proximal end 78, a distal end 80, a length 82 extending from the proximal end 78 to the distal end 80, a handle side 84 configured to face the lift handle 72 of the riding lawn mower 10, a second side 86 opposite to the handle side 84, a width 88 extending from the handle side 84 to the second side 86, a top side 90, a bottom side 92, a height 94 extending from the top side 90 to the bottom side 92, and a slot 96;

ii) a lower bar 98 located an adjustable distance below the upper bar 76, the lower bar 98 comprising a proximal end 100, a distal end 102, a bar length 104 extending from the proximal end 100 to the distal end 102, a handle side 106 configured to face the lift handle 72 of the riding lawn mower 10, a second side 108 opposite of the handle side 106, a width 110 extending from the handle side 106 to the second side 108, a top side 112, a bottom side 114, a height 116 extending from the top side 112 to the bottom side 114, and a slot 118;

iii) a rotatable knob 44 located above the upper bar 76 and the lower bar 98;

iv) a stem 46 located below the knob 44 and above the upper bar 76 and the lower bar 98;

v) a washer 53 located below the stem 48 and above the upper bar 76 and the lower bar 98;

v) a bracket 120 comprising a top arm 122 with an aperture 124 and located above the top side 90 of the upper bar 76, and a bottom arm 126 with an aperture 128 and located below the bottom side 114 of the lower bar 98; and vi) a threaded rod 48 extending from the stem 46 and passing through the slots 96 and 118, the apertures 124 and 128 and the washer 53. At least one of the upper bar and lower bar handle sides 84 and 106 include a stop 34 extending therefrom.

Preferably, the bar assembly includes two knobs 44 (a proximal knob and a distal knob), two brackets 120, and two washers 53, as shown in FIGS. 2-8, and each knob 44 has a stem 46 and a threaded rod 48 and each threaded rod 48 pass through a upper bar slot 96, a lower bar slot, 118, an upper arm aperture 124, a lower arm aperture 128 and a washer 53. Generally, the upper bar 76 and lower bar 98 are generally straight; however, the upper bar 76 and lower bar 98 may have a gentle curvature/arch-shape to account for the fact that the lift handle slot 26 on riding lawn mowers 10 has a slight curvature.

Figure 4:
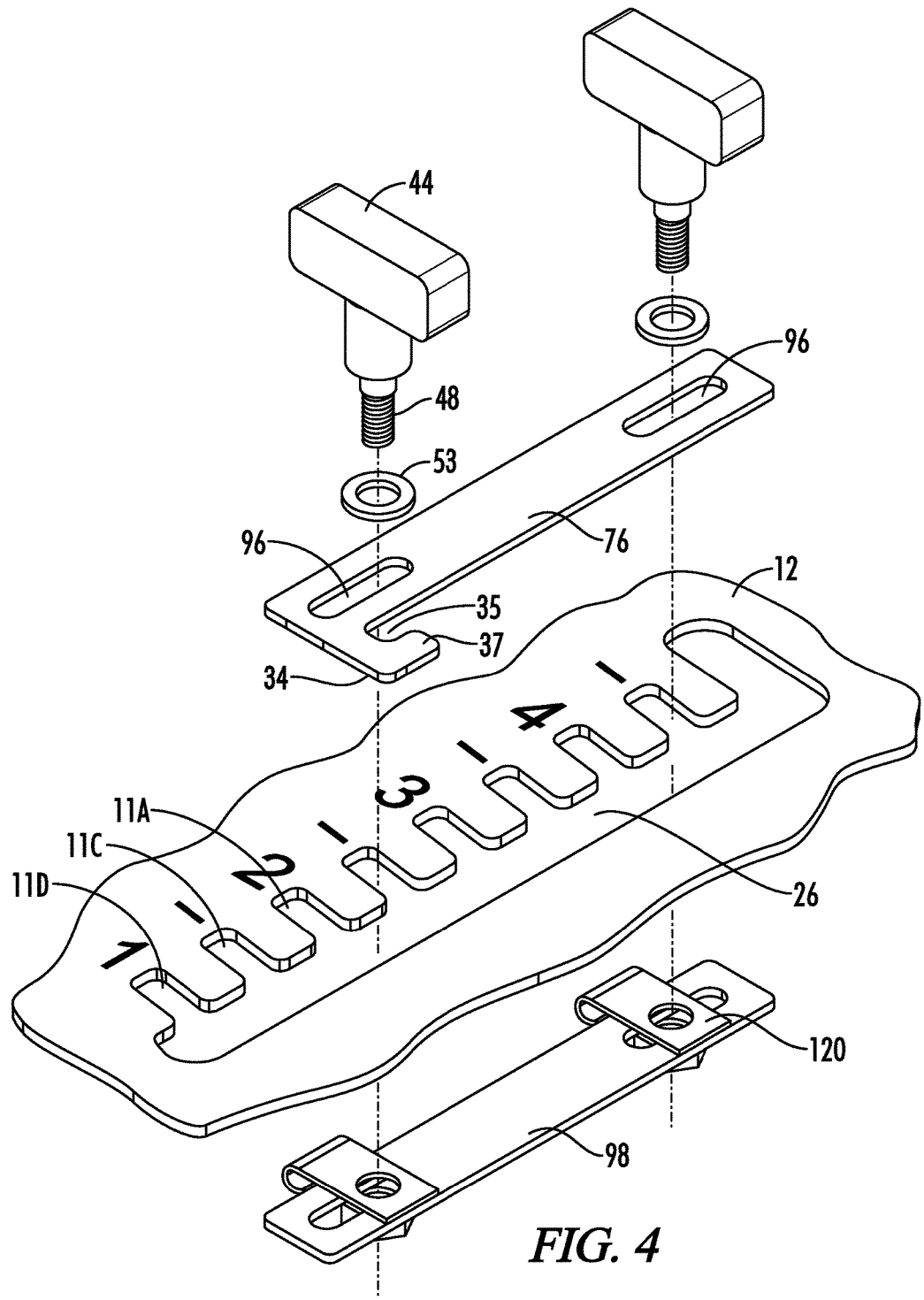
FIG. 4 illustrates an exploded, isometric view of the bar assembly of FIG. 2 and a lift handle assembly of a riding lawn mower; the lift handle is not shown for ease of illustration.
Figure 5:
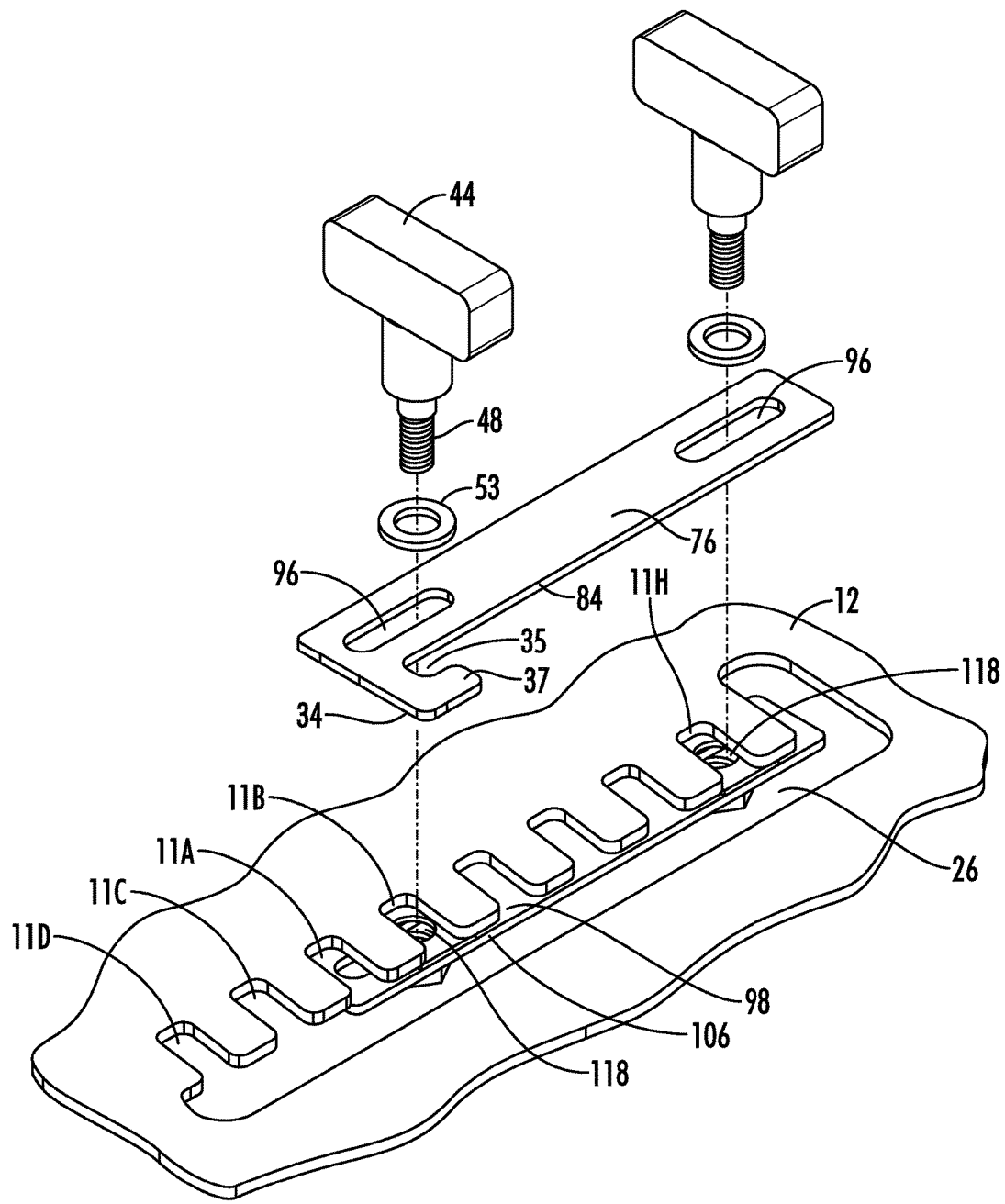
FIG. 5 illustrates another exploded, isometric view of the bar assembly of FIG. 2 and a lift handle assembly of a riding lawn mower; the lift handle is not shown for ease of illustration.
Figure 6:
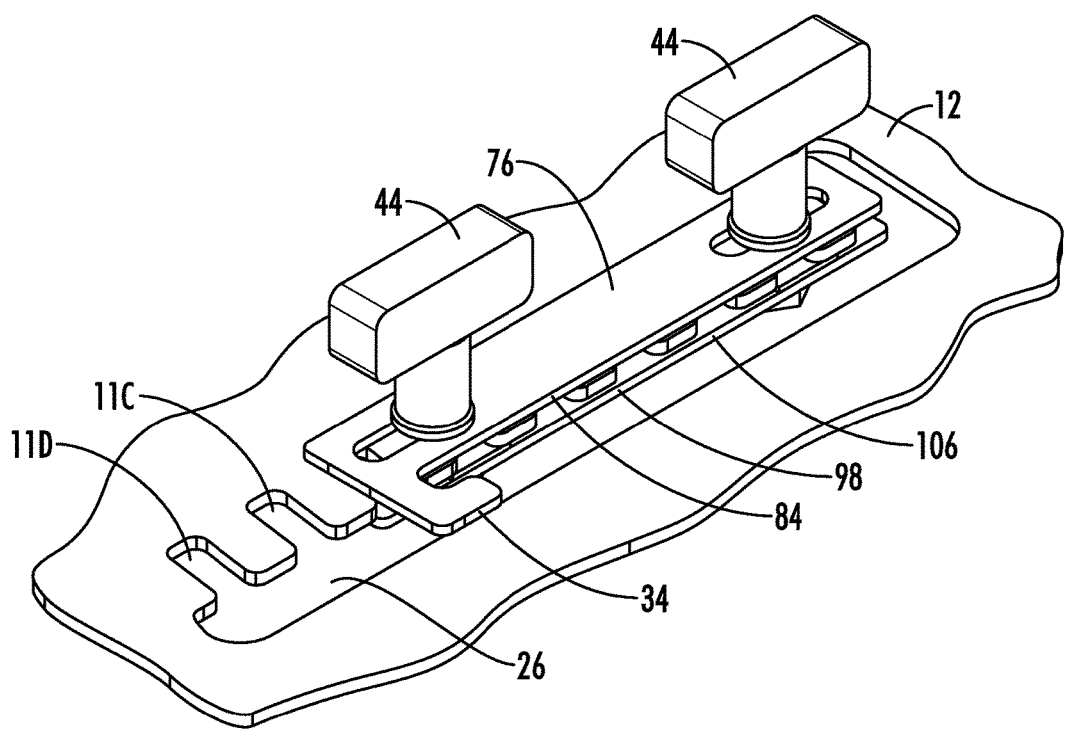
FIG. 6 illustrates an isometric view of the bar assembly of FIG. 2 attached to a lift handle assembly of a riding lawn mower; the lift handle is not shown for ease of illustration.
Figure 7:
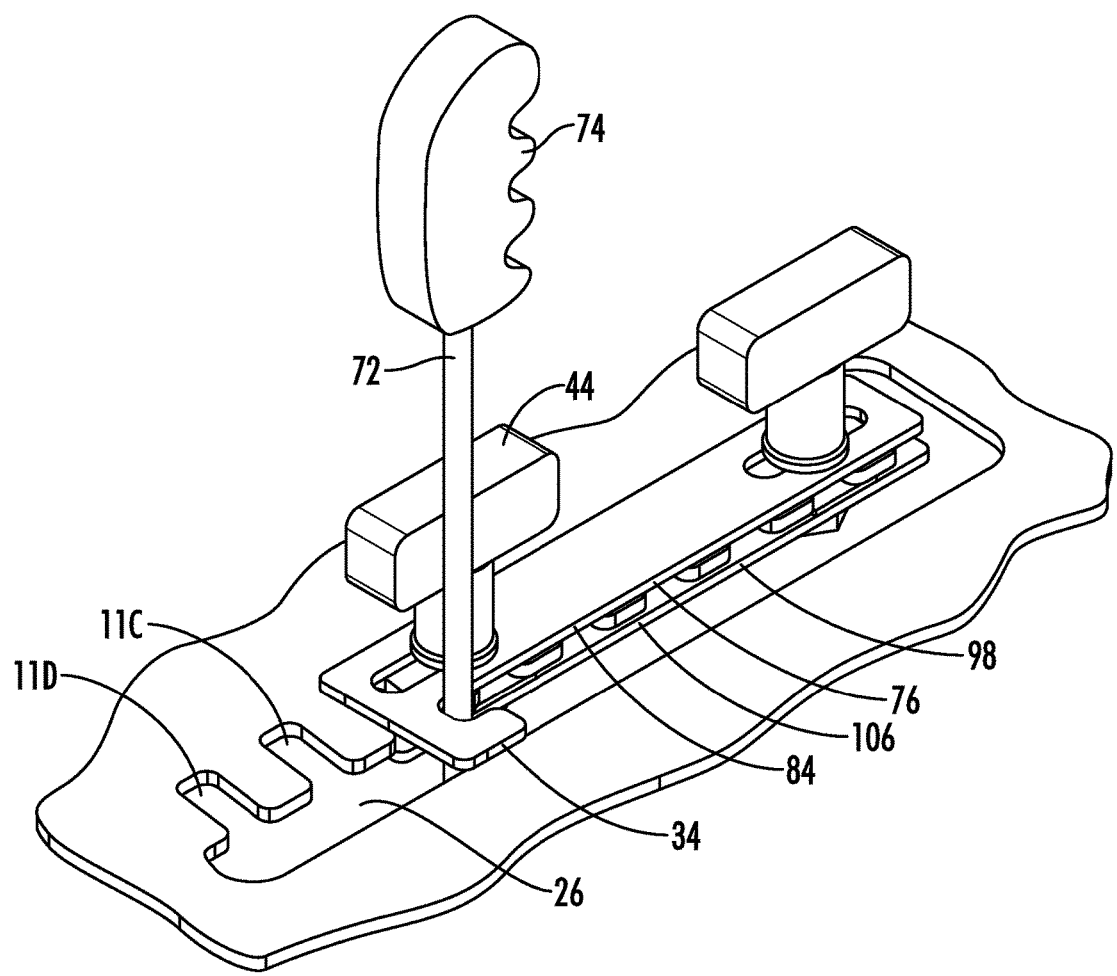
FIG. 7 illustrates another isometric view of the bar assembly of FIG. 2 attached to a lift handle assembly of a riding lawn mower.
Figure 8:
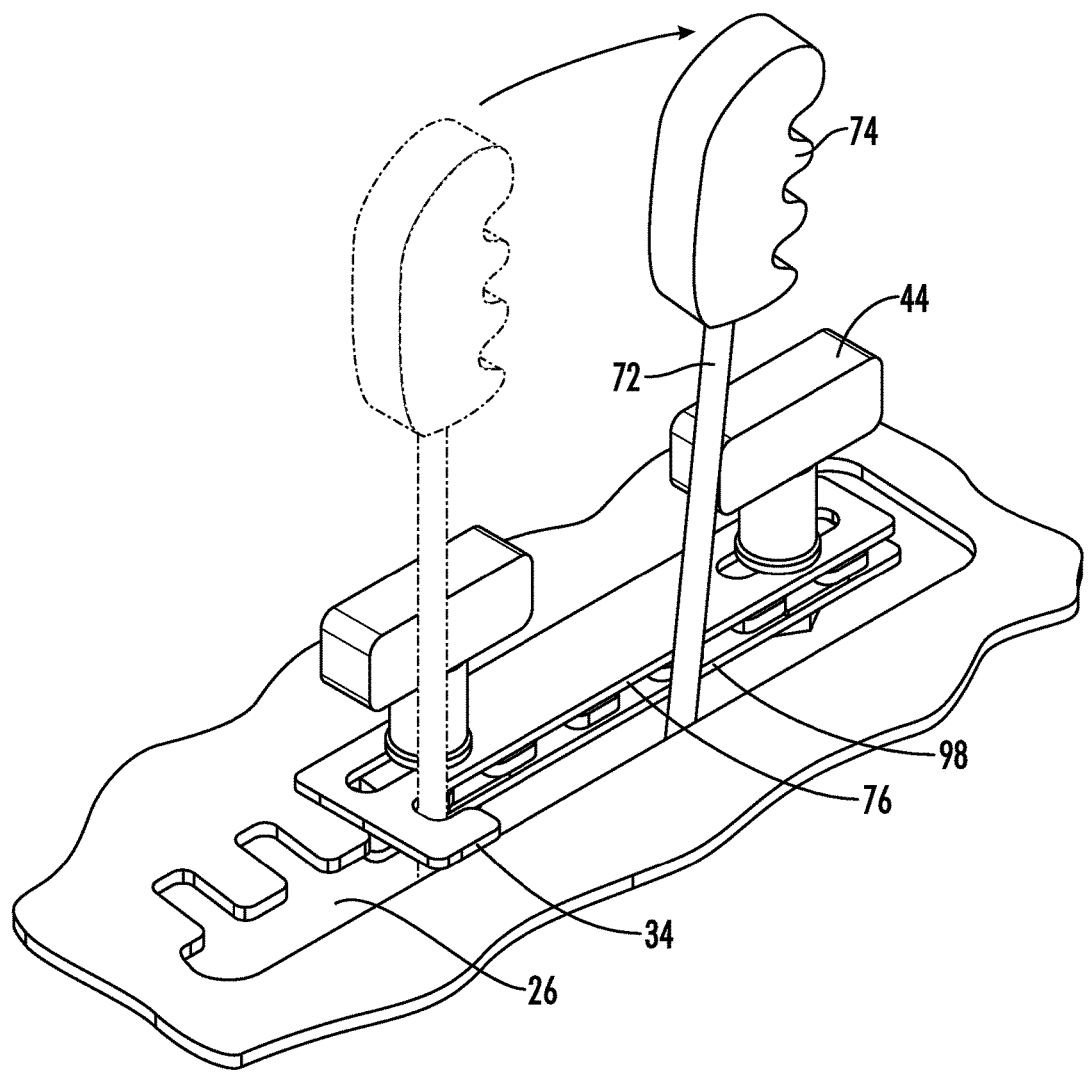
FIG. 8 illustrates another isometric view of the bar assembly of FIG. 2 attached to a lift handle assembly of a riding lawn mower.

Attachment of the bar assembly to the main frame 12 is partially illustrated in FIGS. 4-6. First, the bar assembly is opened by rotating the knob (s) 44 in one direction (e.g., counter-clockwise), which causes the upper and lower bars 76 and 98 to move apart. The rod(s) 48 is then placed into a tooth (teeth 11A and 11H in the illustration), the upper bar 76 is located above the teeth 11A-I and the lower bar 98 is located below the teeth 11A-I. The bar assembly is positioned so that the lift handle 72 rests against the stop 34. The bar assembly is then tightened by rotating the knob(s) 44 in the opposite direction (e.g., clockwise), which causes the upper and lower bars 76 and 98 to move together and bracket the main frame 12. The lift handle 72 is now able to move freely along the handle sides 84 and 106 distal, but not proximal, to the stop 34 for a distance of at least 2 inches (preferably about 2 to about 8 inches) without encountering a tooth 11. Preferably, the bar assembly at least partially covers all the teeth 11. It will be understood that only covering the handle-side of the teeth 11 is necessary in order for the lift handle 72 to contact the handle sides 84 and 106 of the upper and lower bars 76 and 98 rather than the teeth 11A-I. Preferably, the bottom arm and upper arm apertures 124 and 128 of the bracket(s) 120 are about the same diameter as the diameter of the threaded rod(s) 48 but the slots 96 and 118 and of the upper arm and lower bars 76 and 98 are much wider (e.g., 200% to about 2000%) than the diameter of the threaded rod(s) 46 so that the bar assembly can be used in riding lawn mowers 10 from a variety of manufacturers, which have different sized teeth 11A-11I. Preferably, the width 88 and 110 of the upper and lower bars 76 and 98 are about the same size and are about 0.5 to about 1.5 inches. Preferably, the length 82 and 104 of the upper and lowers bars 76 and 98 are about the same size and are about 4 to about 8 inches. The stop 34 preferably extends about 0.25 inches to about 1 inch from the handle side 84 or 106 of at least one bar 76 or 98 (preferably the upper bar 76). Optionally, the stop 34 includes a distally extending hook 37 that creates a recess 35 between the hook 37 and the upper bar 76 for receiving the lift handle 72.

It will be appreciated that the orientation of the bar assembly components may need to altered depending on the model of the riding lawn mower 10 retrofitted with the bar assembly. For example, in the illustrated embodiments in FIGS. 2-8, the stop 34 extends from the lower, right side of the upper bar 76 because the handle slot 26 is located to the right of the teeth 11. However, if the handle slot 26 is located to the left of the teeth 11, the stop 34 may extend from the lower, left side of the upper bar 76.

The second group of systems provided by the present invention relate to a new design for a riding lawn mower 10 that has a built-in stop system, as illustrated in FIGS. 12-15. In other words, whereas FIGS. 2-8 describe a bar assembly for retrofitting an existing riding lawn mower 10, FIGS. 12-15 describe a riding lawn mower 10 with a built-in stop system.

Figure 12:
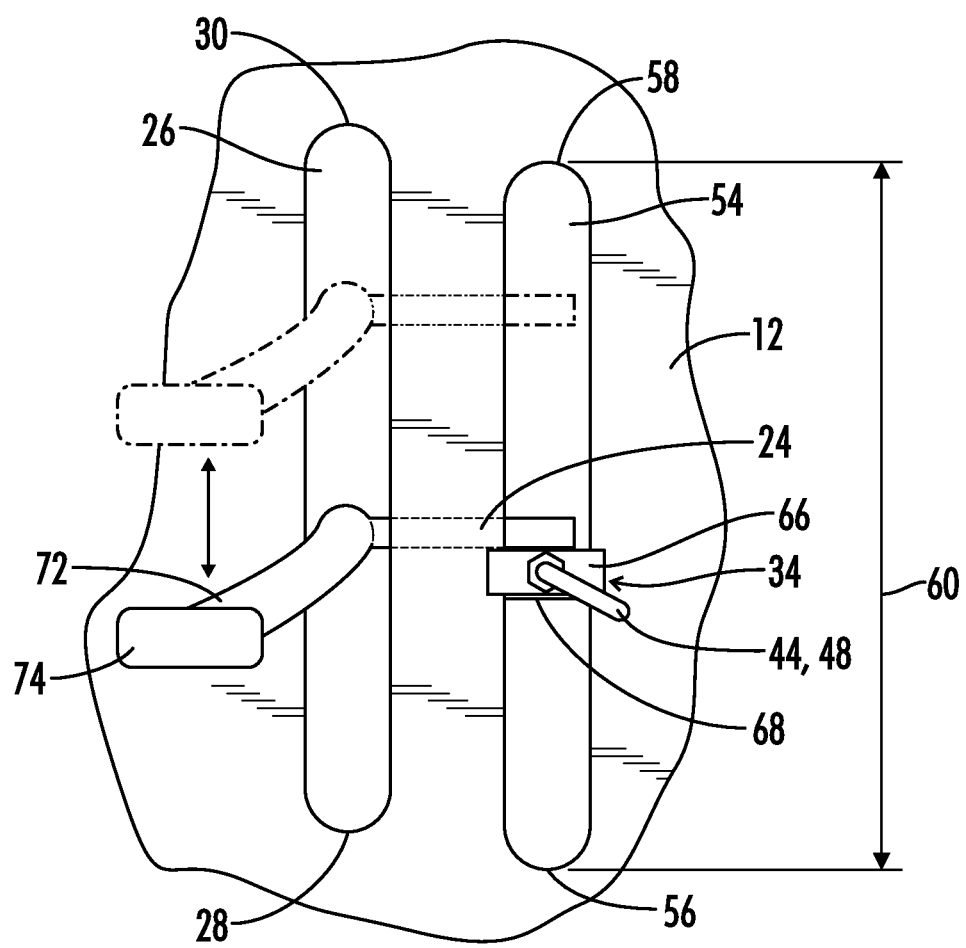
FIG. 12 illustrates a top, perspective view of a lift handle assembly and adjustment assembly of one embodiment of the present invention.
Figure 13:
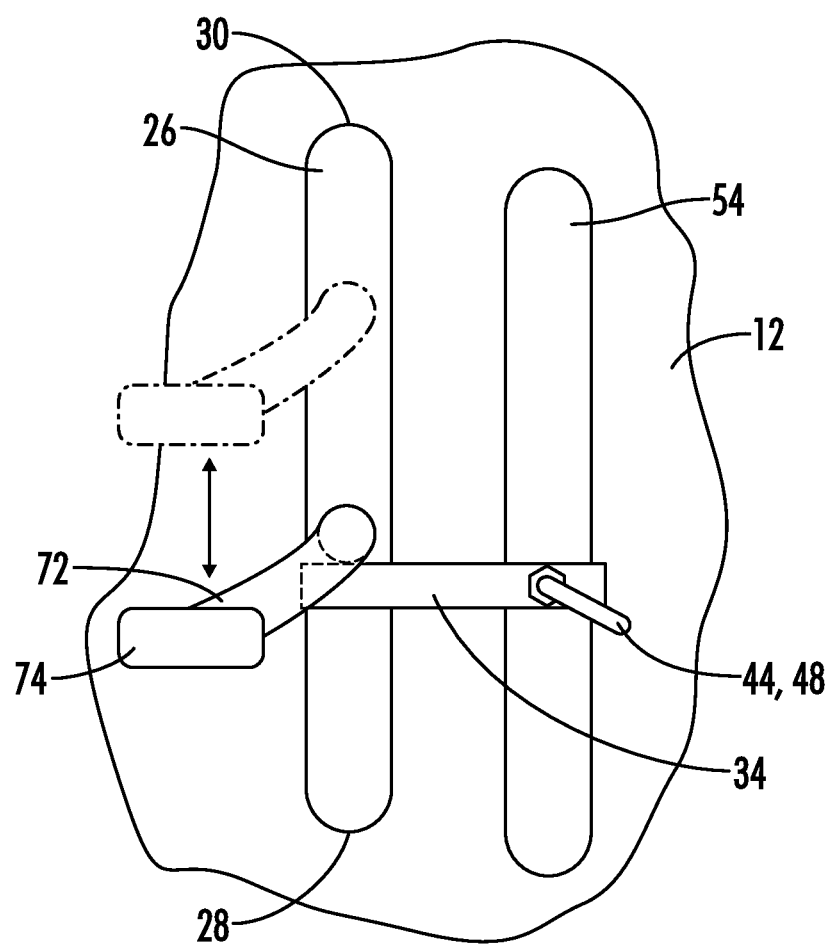
FIG. 13 illustrates a top, perspective view of a lift handle assembly and adjustment assembly of another embodiment of the present invention.
Figure 14:
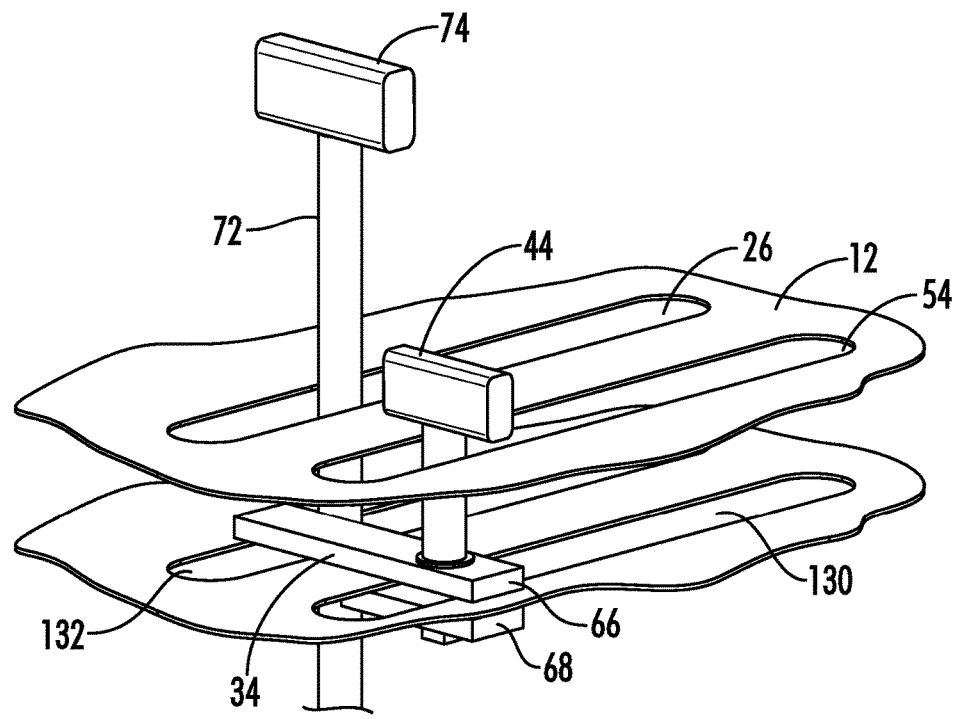
FIG. 14 illustrates an isometric view of a lift handle assembly and adjustment assembly of another embodiment of the present invention.
Figure 15:
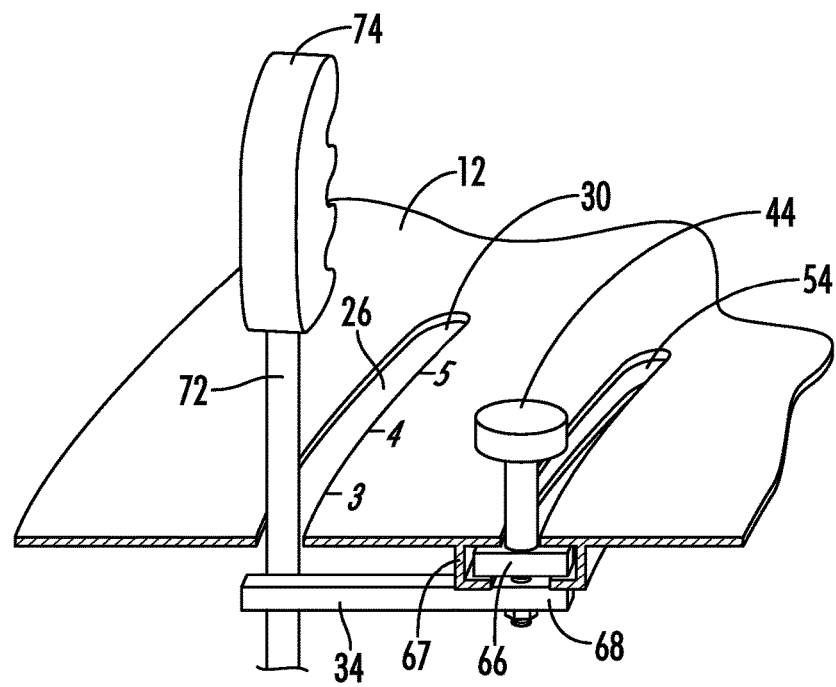
FIG. 15 illustrates a proximal, perspective view of a lift handle assembly and adjustment assembly of another embodiment of the present invention.

For example, in one embodiment of the second group of systems, the main frame 12 of the riding lawn mower 10 includes an adjustment slot assembly that comprises an adjustment slot 54 generally parallel to, and next to (i.e., to the side of) the handle slot 26. The adjustment slot 54 includes a proximal end 56, a distal end 58, and an adjustment slot length 60 extending from the proximal end 56 to the distal end 58. The adjustment slot assembly further comprises an adjustment knob 44 that is attached to an upper arm 66 and a lower arm 68 that releasably bracket the main frame 12. The lift handle 72 in FIG. 12 includes a lateral extension 24 that contacts the upper arm 66 or lower arm 68 (preferably the lower arm 68) so that the lower arm 68 or upper arm 66 acts as the moveable stop 34 that prevents the lift handle 72 from moving proximally relative to the stop 34. Optionally, the lateral extension 24 extends from the lift handle at an angle of between about 85 to about 95 degrees. The lift handle 72 is able to freely guide distally from the stop 34 as in the prior embodiments. The upper arm 66 and lower arm 68 are moveable by turning the knob 44 in one direction (e.g., counter-clockwise) to increase the distance between the upper and lower arms 66 and 68. The upper arm 66 and lower arm 68 of the adjustment assembly are then moved into a desired location along the adjustment slot length 60 and the knob 44 is turned in the other direction (e.g. clockwise) to decrease the distance between the upper and lower arms 66 and 68. FIG. 13 is a variation of the system of FIG. 12, except that the stop 34 extends in the handle slot 26 in FIG. 13, which obviates the need for the lateral extension 24. The systems of FIG. 12 and FIG. 13 could cause the main frame 12 to be scratched after extensive use of the adjustment slot assembly. Thus, FIG. 14 provides one variation in which the system has a lower handle slot 132 and a lower adjustment slot 130. The lower adjustment slot 130 has a proximal end, a distal end, and a lower adjustment slot length extending from the proximal end to the distal end, and the adjustment assembly moves along the lower adjustment slot 130 length. In such embodiments, the lower handle slot 132 is optional. FIG. 15 provides another variation in which the adjustment assembly includes a track 67 below the adjustment slot 54 and the upper arm 66 rides in the track 67. The track 67 is directly below the adjustment slot 54 and the track 67 has a proximal end, a distal end, and a track length that extends from the proximal end to the distal end and is generally parallel to the adjustment slot length 60. The lower arm 68 is moveable below the track 67 and includes the stop 34. To move the stop 34 of FIG. 15, the knob 44 is rotated in one direction (e.g., counterclockwise) to lower the height of the lower arm 68, the lower and upper arms 66 and 68 are then moved distally or proximally, and then the knob 44 is turned in the other direction (e.g., clockwise), which causes the lower arm 68 to move upwardly and frictionally lock the upper arm 66 at a desired location along the length of the track 67. Optionally, numerals indicating the cutting height are placed next to locations along the adjustment slot 54, as shown in FIG. 15. In FIGS. 12-15, the adjustment knob 44 may be a distinct knob that is connected to a threaded rod 48, as shown in FIGS. 14 and 15, or alternatively, the adjustment knob may be the threaded rod itself, as shown in FIGS. 12-13. For purposes of the present invention, a "knob" is any item such as a handle or a rod that can be griped and adjusted (e.g., rotated) by a human. Optionally, as shown in FIGS. 12-15, the threaded rod 48 passes through apertures in the upper and lower arms 66 and 68.

The present invention is particularly directed to manual handle lift systems that use the stop 34 and gravity, as opposed to a hydraulic apparatus, to set the height of the cutting deck 16 relative to the main frame 12. In other words, when the riding lawn mower 10 is on even terrain, the handle 72 will rest against the stop 34 due to the gravitational force pulling on the cutting deck 16.

Terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

Having now described the invention in accordance with the requirements of the patent statutes, those skilled in the art will understand how to make changes and modifications to the disclosed embodiments to meet their specific requirements or conditions. Changes and modifications may be made without departing from the scope and spirit of the invention, as defined and limited solely by the following claims.

What is claimed is:

1. A riding lawn mower comprising:
   i) a main frame;
   ii) a plurality of main wheels connected to the main frame;
   iii) a cutting deck comprising at least one blade connected to the main frame;
   iv) a motor configured to turn the at least one blade and at least one of the main wheels;
   v) a lift handle assembly comprising a lift handle connected to the cutting deck, a handle slot located in the main frame and comprising a slot proximal end, a slot distal end, a moveable stop located immediately proximal to the handle, and a slot length extending from the slot proximal end to the slot distal end, the lift handle located in the slot and extending above the slot and configured to freely glide along the slide length distal to the stop,
   the stop configured to prevent the handle from moving proximal to the stop,
   wherein, when the terrain located under the cutting deck is higher than the terrain under the main wheels, the lift handle is configured to glide distally from the stop and cause the cutting deck to rise relative to the frame.

2. The riding lawn mower of claim 1, wherein the riding mower comprises a seat connected to the main frame and configured to carry a human passenger.

3. The riding lawn mower of claim 1, wherein the riding mower comprises a steering wheel connected to the main frame and configured to steer the riding lawn mower.

4. The riding lawn mower of claim 1, wherein the cutting deck comprises a plurality of cutting deck wheels.

5. The riding lawn mower of claim 1, wherein the cutting deck comprises a roller.

6. The riding lawn mower of claim 1, wherein the stop is a moveable bar.

7. The riding lawn mower of claim 1 further comprising an adjustment assembly comprising an adjustment slot adjacent to the handle slot and located in the main frame and an adjustment knob connected to the stop, the adjustment slot having a proximal end, a distal end, and a length extending from the proximal end to the distal end, the adjustment knob slideable directly above the adjustment slot and configured to move the stop.

8. The riding lawn mower of claim 7, wherein the adjustment assembly further comprises a track directly below the adjustment slot, the track having a proximal end, a distal end, and a track length extending from the proximal end to the distal end, an upper arm located in the track, the upper arm comprising an aperture and configured to slide along the track length, a lower arm directly below the track and comprising an aperture, the stop extending from the lower arm, a threaded rod passing through upper arm and the lower arm apertures, wherein adjustment of the knob is configured to cause the lower arm to move upwardly towards the track and the upper arm and frictionally lock the upper arm at a position along the track length.

9. The riding lawn mower of claim 7 further comprising a lower slot located directly below the adjustment slot, the lower slot having a proximal end, a distal end, and a length extending from the proximal end to the distal end, a threaded rod extending from the knob, the threaded rod having an upper end connected to the knob and a lower end, a first arm comprising an aperture, a second arm comprising an aperture, the threaded rod passing through the apertures, the first arm and the second arm configured to slide along the main frame, wherein adjustment of the knob is configured to cause the first arm and second arm to move toward each other and frictionally lock the firm arm and the second arm at a position along the lower slot length.

10. The riding lawn mower of claim 7, wherein the adjustment slot length is generally parallel to the handle slot length.

11. A riding lawn mower comprising:
    i) a main frame;
    ii) a plurality of main wheels connected to the main frame;
    iii) a cutting deck comprising at least one blade connected to the main frame;
    iv) a motor configured to turn the at least one blade and at least some of the main wheels;
    v) a lift handle assembly comprising a lift handle connected to the cutting deck, a handle slot located in the main frame and comprising a slot proximal end, a slot distal end, a slot length extending from the slot proximal end to the slot distal end, and a bar extending from the lift handle, the lift handle located in the slot and extending above the slot; and vi) an adjustment assembly comprising an adjustment slot adjacent to the handle slot and located in the main frame, a stop and an adjustment knob connected to the stop, the adjustment slot having a proximal end, a distal end, and a length extending from the proximal end to the distal end, the adjustment knob slideable along the adjustment slot length and configured to move the stop along the adjustment slot length;

wherein the stop is configured to releasably engage the handle bar and prevent the handle bar from moving proximal to the stop, and wherein, when the terrain located under the cutting deck is higher than the terrain under the main wheels, the lift handle is configured to glide distally from the stop and cause the cutting deck to rise relative to the frame.

12. The riding lawn mower of claim 11, wherein the bar extends from the lift handle at an angle of between about 85 and about 95 degrees relative to the lift handle.

13. The riding lawn mower of claim 11, wherein the bar extends from the lift handle below the handle slot.

14. A method of retrofitting a riding lawn mower to allow a cutting deck to float relative to a main frame, the method comprising:
  a) providing a riding lawn mower comprising:
    i) a main frame;
    ii) a plurality of main wheels connected to the main frame;
    iii) a cutting deck comprising at least one blade connected to the main frame;
    iv) a motor configured to turn the at least one blade and at least one of the main wheels;
    v) a lift handle assembly comprising a lift handle connected to the cutting deck, a slot located in the main frame and comprising a slot proximal end, a slot distal end, and a slot length extending from the slot proximal end to the slot distal end, and a plurality of teeth adjacent to the slot, the lift handle extending above the slot and configured to move from a first tooth to a second tooth distal to the first tooth, wherein the movement of the lift handle from the first tooth to the second tooth is configured to cause the cutting deck to rise relative to the frame;
  b) providing a bar assembly comprising a first bar, the first bar having a proximal end, a distal end, a length extending from the proximal end to the distal end, a handle side configured to face the lift handle, a second side opposite to the handle side, a width extending from the handle side to the second side, and a stop extending laterally from the handle side; and
  c) attaching the bar assembly to the main frame of the riding lawn mower so that the bar assembly at least partially covers at least one tooth, so that the lift handle is able to freely glide along the handle side distal to the stop, and so that the stop prevents the handle from moving proximal to the stop.

15. The method of claim 14, wherein the riding mower comprises a seat connected to the main frame and configured to carry a human passenger.

16. The method of claim 14, wherein the riding mower comprises a steering wheel connected to the main frame and configured to steer at least one of the plurality of wheels.

17. The method of claim 14, wherein, after step c, the method further comprises
  d) moving the lift handle along the bar length distal to the stop.

18. The method of claim 17, wherein the moving of the lift handle along the handle side distal to the stop causes the cutting deck to rise relative to the main frame.

19. The method of claim 14, wherein the method further comprises: d) moving the lawn mower over uneven terrain so that the terrain under the cutting deck is higher than the terrain under the main wheels; e) allowing the handle to move along the handle side distally from the stop; and f) allowing the cutting deck to rise relative to the main frame.

20. The method of claim 14, wherein the bar assembly further comprises a second bar, the second bar having a proximal end, a distal end, a length extending from the proximal end to the distal end, a handle side configured to face the lift handle, a second side opposite to the handle side, a width extending from the handle side to the second side, the first bar spaced a distance from the second bar, and further wherein step c) comprises bracketing the teeth with the first bar and the second bar.

* * * * *